US012589470B2

(12) United States Patent
Franks

(10) Patent No.: US 12,589,470 B2
(45) Date of Patent: Mar. 31, 2026

(54) SOCKET SYSTEMS AND METHODS

(71) Applicant: IMPERIAL-Newton Corp, Centennial, CO (US)

(72) Inventor: Eric J. Franks, Centennial, CO (US)

(73) Assignee: IMPERIAL-Newton Corp, Centennial, CO (US)

( * ) Notice: Subject to any disclaimer, the term of this patent is extended or adjusted under 35 U.S.C. 154(b) by 0 days.

(21) Appl. No.: 19/190,240

(22) Filed: Apr. 25, 2025

(65) Prior Publication Data

US 2025/0332694 A1 Oct. 30, 2025

Related U.S. Application Data

(60) Provisional application No. 63/639,398, filed on Apr. 26, 2024.

(51) Int. Cl.

*B25B 13/06* (2006.01)
*B25B 23/00* (2006.01)
*B65D 90/00* (2006.01)

(52) U.S. Cl.

CPC ........ *B25B 13/065* (2013.01); *B25B 23/0035* (2013.01); *B61D 5/08* (2013.01)

(58) Field of Classification Search

CPC ... B25B 13/065; B25B 23/0035; B25B 23/00; B25B 13/50; B25B 13/48; B61D 5/08
See application file for complete search history.

(56) References Cited

U.S. PATENT DOCUMENTS

| | | | | |
|---|---|---|---|---|
| 472,300 A * | 4/1892 | Mondula | B61D 3/16 105/328 |
| 2,339,006 A * | 1/1944 | Folmsbee | F16J 13/18 220/315 |
| 2,956,462 A * | 10/1960 | Paul | B25B 13/483 81/125 |
| 5,259,278 A * | 11/1993 | Leas | B25B 23/00 81/125 |
| 5,551,320 A * | 9/1996 | Horobec | B25B 13/065 81/53.2 |
| 5,782,148 A * | 7/1998 | Kerkhoven | B25B 13/06 81/186 |
| 2017/0106503 A1* | 4/2017 | Williams | B25B 21/02 |
| 2018/0141188 A1* | 5/2018 | Lai | B25B 13/462 |
| 2024/0066920 A1* | 2/2024 | Ong | B60B 29/006 |

FOREIGN PATENT DOCUMENTS

| | | | |
|---|---|---|---|
| EP | 0747179 A1 * | 12/1996 | B25G 1/125 |
| JP | H08323634 A * | 12/1996 | B25B 13/06 |

* cited by examiner

*Primary Examiner* — Bayan Salone
(74) *Attorney, Agent, or Firm* — Fish & Richardson P.C.

(57) ABSTRACT

A tanker rail car socket tool includes a drive cylinder including a bore sized to receive at least a portion of a threaded bolt configured to secure a tanker car lid to a tanker rail car; a drive opening formed in a first end of the drive cylinder and sized to receive a portion of a tool configured to transmit torque to the drive cylinder when engaged with the drive opening; and a socket head coupled to a second end of the drive cylinder opposite the first end. The socket head includes a nut opening defined by a plurality of torque-transferring surfaces. The torque-transferring surfaces are configured to transfer the torque transmitted to the drive cylinder by the tool to a nut threaded over the threaded bolt to secure the tanker car lid to the tanker rail car.

20 Claims, 7 Drawing Sheets

SOCKET SYSTEMS AND METHODS

CROSS-REFERENCE TO RELATED APPLICATION

This application claims priority under 35 U.S.C. § 119 to U.S. Provisional Patent Application Ser. No. 63/639,398, filed on Apr. 26, 2024, the entire contents of which are incorporated herein by reference.

TECHNICAL FIELD

The present disclosure describes sockets, as well as socket systems and methods, including socket systems and methods for securing or opening tanker car lids.

BACKGROUND

Bolts and other fasteners are often used to secure a cover or lid to a container. The railway shipping industry uses lids or covers to enclose a commercial or industrial product, and often a hazardous material (including flammable, corrosive and reactive materials) in a tanker car. These lids or covers (commonly “manway cover” or “dome lid”) are secured to a port on top of the tanker car by one or more fasteners. Often, securing the lid or cover to the tanker car is critical in maintaining the product (especially a hazardous material) completely enclosed in the tanker car. A socket wrench can be used to secure the lid or cover to the tanker car.

SUMMARY

In an example implementation, a tanker rail car socket tool includes a drive cylinder including a bore sized to receive at least a portion of a threaded bolt configured to secure a tanker car lid to a tanker rail car; a drive opening formed in a first end of the drive cylinder and sized to receive a portion of a tool configured to transmit torque to the drive cylinder when engaged with the drive opening; and a socket head coupled to a second end of the drive cylinder opposite the first end. The socket head includes a nut opening defined by a plurality of torque-transferring surfaces. The torque-transferring surfaces are configured to transfer the torque transmitted to the drive cylinder by the tool to a nut threaded over the threaded bolt to secure the tanker car lid to the tanker rail car.

In an aspect combinable with the example implementation, the portion of the tool includes a square peg.

In another aspect combinable with one, some, or all of the previous aspects, the socket head is formed of a non-flammable and non-sparking material.

In another aspect combinable with one, some, or all of the previous aspects, the socket head is integrally formed with the drive cylinder.

Another aspect combinable with one, some, or all of the previous aspects includes a shoulder formed between the drive cylinder and the socket head.

In another aspect combinable with one, some, or all of the previous aspects, the plurality of torque-transferring surfaces include a plurality of points and a plurality of sidewalls.

In another aspect combinable with one, some, or all of the previous aspects, a number of the plurality of points is at least equal to a number of the plurality of sidewalls.

In another aspect combinable with one, some, or all of the previous aspects, the plurality of points and a plurality of sidewalls are configured to contactingly engage the nut to transfer the torque transmitted to the drive cylinder by the tool to the nut.

In another aspect combinable with one, some, or all of the previous aspects, the plurality of points are one of: 4 points, 5 points, 6 points, 8 points, or 12 points.

In another aspect combinable with one, some, or all of the previous aspects, a drive end diameter is between 1.5-3.5 inches; a stud clearance depth of the socket head is between 4.0-9.0 inches; a nut depth of the socket head is between 1.1-2.8 inches; a bore diameter of the drive cylinder is between 1.2-2.8 inches; an overall length is between 4.8-11.0 inches; a nut OD length is between 1.4-3.5 inches; and a nut end OD is between 2.0-4.0 inches.

In another example implementation, a method includes identifying a threaded bolt that secures a tanker car lid to a tanker rail car; and operating a tanker rail car socket tool to thread or unthread a nut to or from the threaded bolt. The tanker rail car socket tool includes a drive cylinder including a bore sized to receive at least a portion of the threaded bolt; a drive opening formed in a first end of the drive cylinder and sized to receive a portion of a tool configured to transmit torque to the drive cylinder when engaged with the drive opening; and a socket head coupled to a second end of the drive cylinder opposite the first end, the socket head including a nut opening defined by a plurality of torque-transferring surfaces, the torque-transferring surfaces configured to transfer the torque transmitted to the drive cylinder by the tool to the nut.

In an aspect combinable with the example implementation, the portion of the tool includes a square peg.

In another aspect combinable with one, some, or all of the previous aspects, the socket head is formed of a non-flammable and non-sparking material.

In another aspect combinable with one, some, or all of the previous aspects, the socket head is integrally formed with the drive cylinder.

In another aspect combinable with one, some, or all of the previous aspects, the tanker rail car socket tool includes a shoulder formed between the drive cylinder and the socket head.

In another aspect combinable with one, some, or all of the previous aspects, the plurality of torque-transferring surfaces include a plurality of points and a plurality of sidewalls.

In another aspect combinable with one, some, or all of the previous aspects, a number of the plurality of points is at least equal to a number of the plurality of sidewalls.

In another aspect combinable with one, some, or all of the previous aspects, the plurality of points and a plurality of sidewalls are configured to contactingly engage the nut to transfer the torque transmitted to the drive cylinder by the tool to the nut.

In another aspect combinable with one, some, or all of the previous aspects, the plurality of points are one of: 4 points, 6 points, 8 points, or 12 points.

In another aspect combinable with one, some, or all of the previous aspects, a drive end diameter is between 1.5-3.5 inches; a stud clearance depth of the socket head is between 4.0-9.0 inches; a nut depth of the socket head is between 1.1-2.8 inches; a bore diameter of the drive cylinder is between 1.2-2.8 inches; an overall length is between 4.8-11.0 inches; a nut OD length is between 1.4-3.5 inches; and a nut end OD is between 2.0-4.0 inches.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of sockets, as well as socket systems and methods, including socket systems and methods for securing or opening tanker car lids. Generally, example implementations of a socket according to the present disclosure can be used in combination with a tool, such as a socket wrench or spanner, to apply torque to a fastener in order to secure one component to another component. In example implementations according to the present disclosure, a socket can be applied to, e.g., a nut that is threaded onto a bolt (or threaded rod) of a lid for a tanker car. The socket can be manipulated, e.g., by a tool, to apply torque to and consequently tighten or loosen the nut onto or from the bolt or threaded rod.

Figure 1:
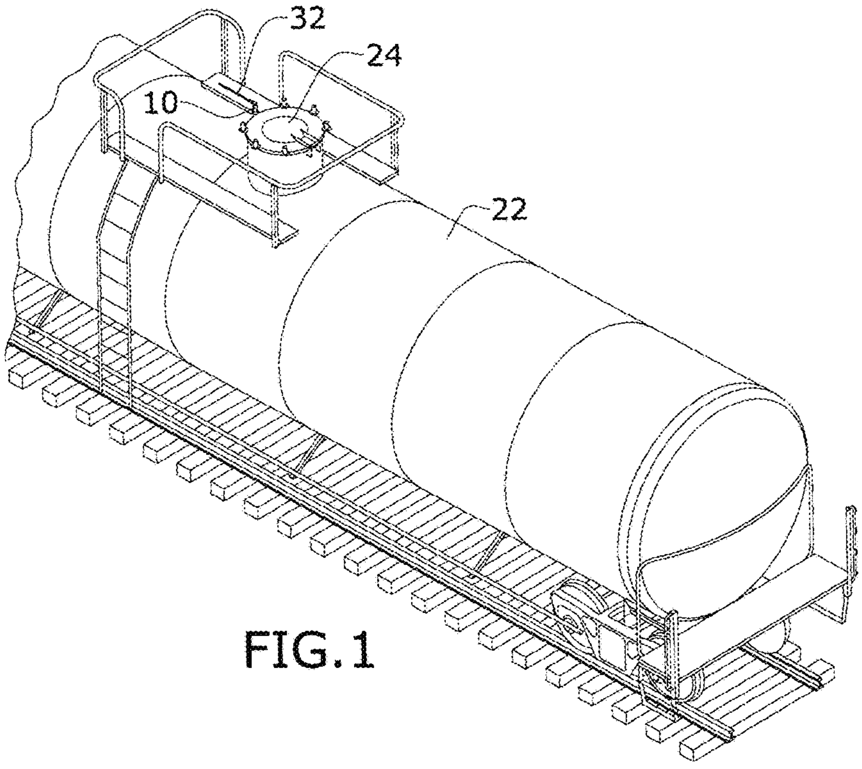
FIG. 1 is a perspective view of a portion of a tanker car on which a lid is secured according to the present disclosure.

FIG. 1 is a perspective view of a portion of a tanker car 22 on which a lid 24 is secured according to the present disclosure. As shown in this example, the tanker car (or tanker rail car) 22 includes a hatch or port onto which the lid 24 is secured, such as to seal a commercial product, e.g., a hazardous material, within the tanker car 22. The hazardous material can be, for example, a solid or fluid (e.g., gas, liquid, mixed phase fluid), which must be contained within the tanker car 22 (e.g., without leakage) during transit or otherwise. Lid 24 provides a seal to the tanker car 22 in order to contain the hazardous (or other) material therein.

Figure 2:
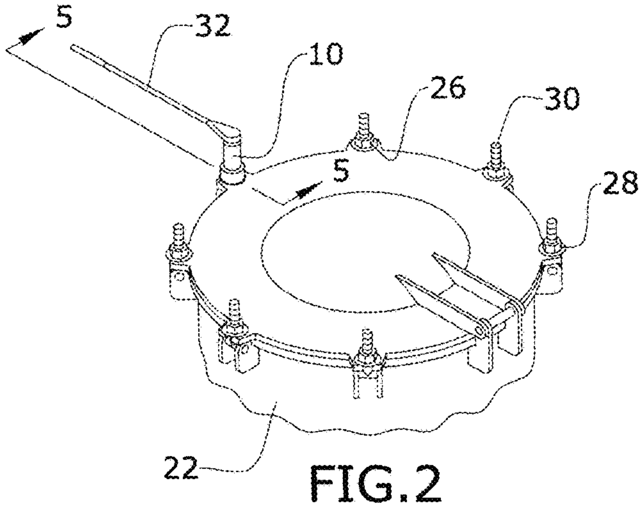
FIG. 2 is a partially enlarged perspective view of a lid of a tanker car that is secured to the tanker car with an example implementation of a socket according to the present disclosure.
Figure 3:
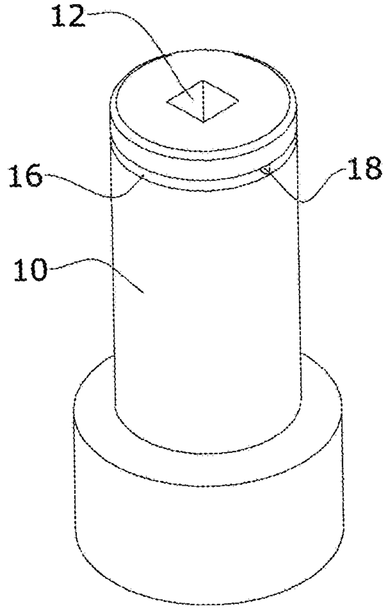
FIG. 3 is a perspective view of an example implementation of a socket according to the present disclosure.
Figure 4:
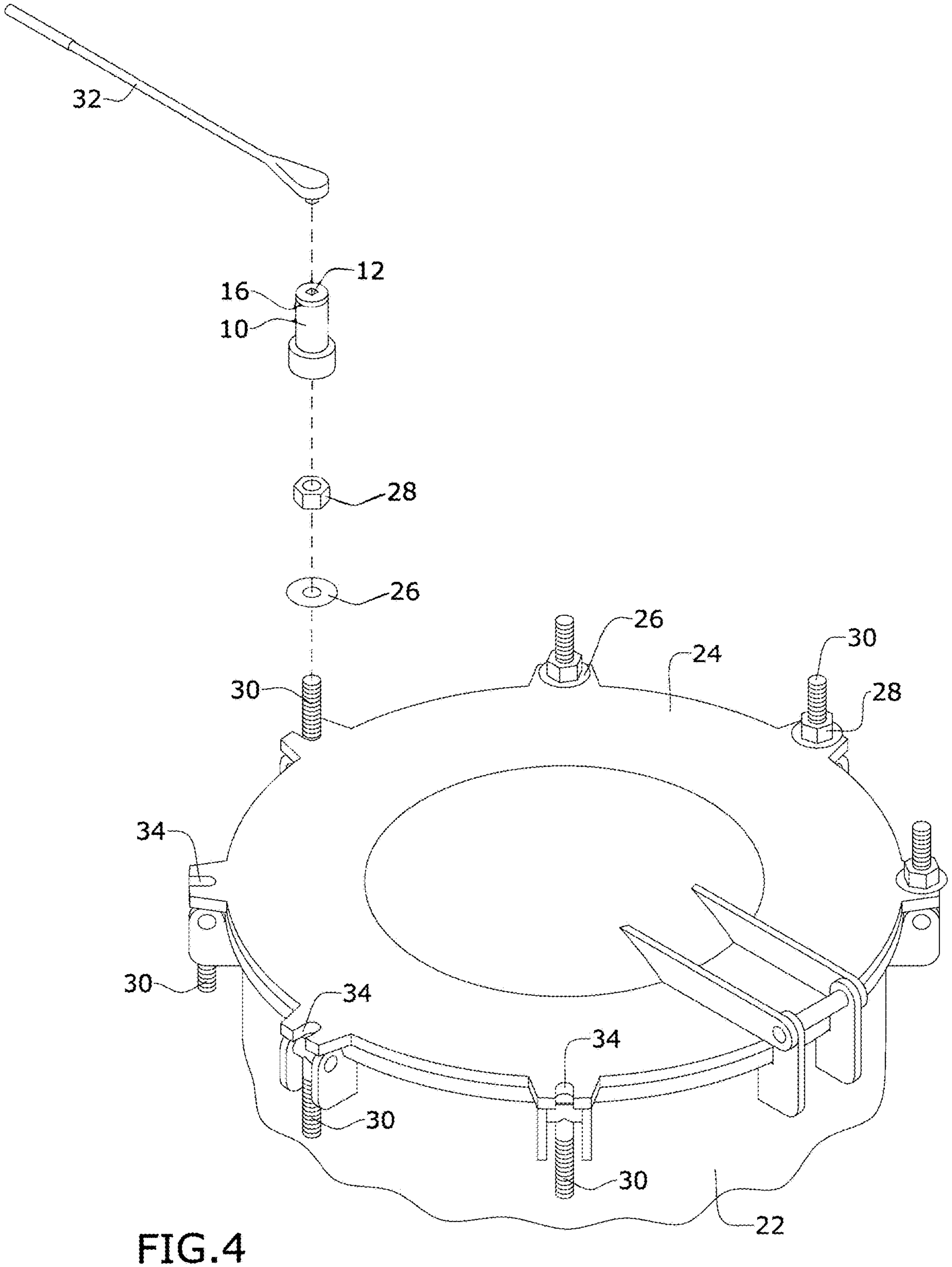
FIG. 4 is an exploded view of a portion of a tanker car on which a lid is secured according to the present disclosure.

With reference also to FIGS. 2-4, these figures show a closer view of the lid 24 and a socket 10 that is used to manipulate one or more fasteners to secure the lid 24 to the tanker car 22. For instance, FIG. 2 is a partially enlarged perspective view of the lid 24 of the tanker car 22 that is secured to the tanker car 22 with an example implementation of the socket 10. FIG. 3 is a perspective view of the example implementation of the socket 10. FIG. 4 is an exploded view of a portion of the tanker car 22 on which the lid 24 is secured. As shown in FIG. 2, the lid 24 can be secured (e.g., sealingly) to the tanker car 22 with one or more (in this example, seven) fastening assemblies. Each fastening assembly includes a threaded rod portion 30 (also called a t-stud 30) that extends through an open slot 34 (shown in FIG. 4), a washer 26, and a nut 28. The washer 26 fits over the t-stud 30 and is secured between the lid 24 (at the open slot 34) by the nut 28 through use of the socket 10 and tool 32. In order to secure the nut 28 over the t-stud 30 (with the washer 26 secured down to the lid 24), torque is applied to the socket 10 by the tool 32 and transferred to the nut 28 to thread the nut 28 over the t-stud 30. In some aspects, a preferred or required amount of torque (e.g., in lb-foot or otherwise) can be used and confirmed by the tool 32 in order to secure the washer 26 and nut 28 over the t-stud 30 and to the lid 24. Once the fastening assemblies have been installed as described, the lid 24 is secured to the tanker car 22 and cannot open (due to interference of the washers 26 with the lid 24).

Figure 6:
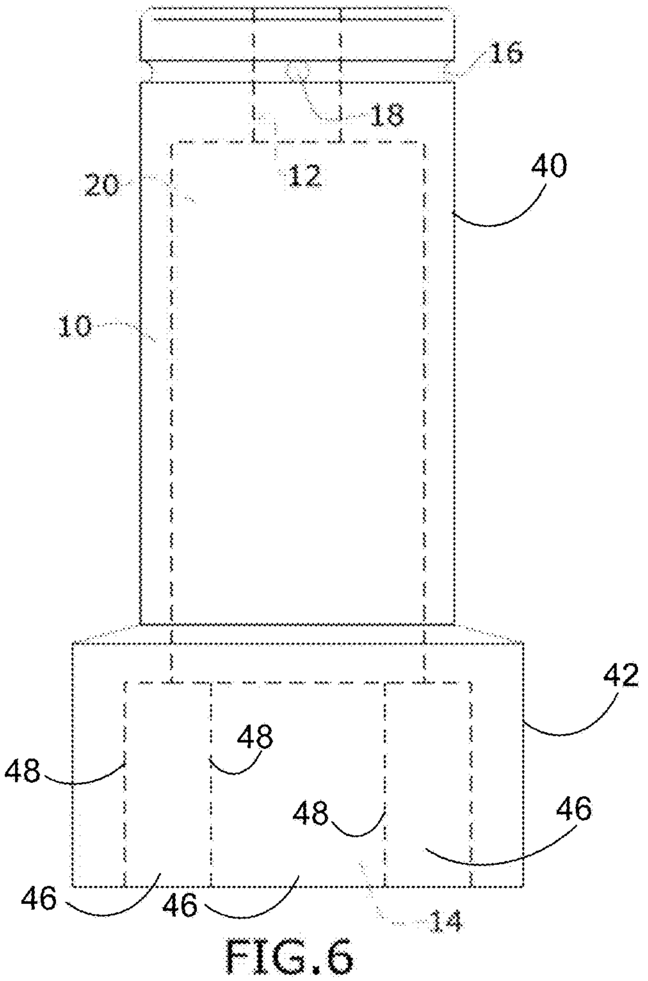
FIGS. 6-8 are front, top, and bottom views, respectively, of an example implementation of a socket according to the present disclosure.
Figure 7:
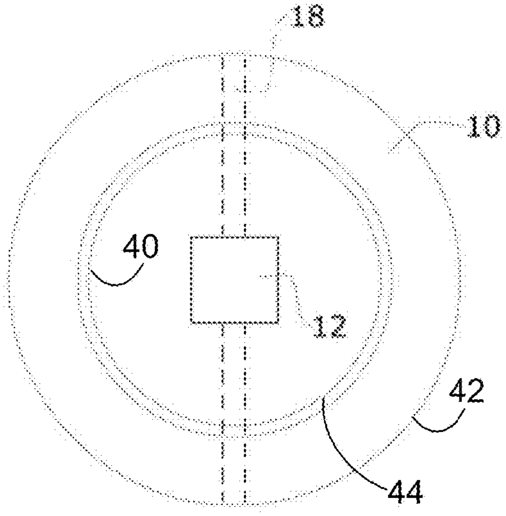
Figure 8:
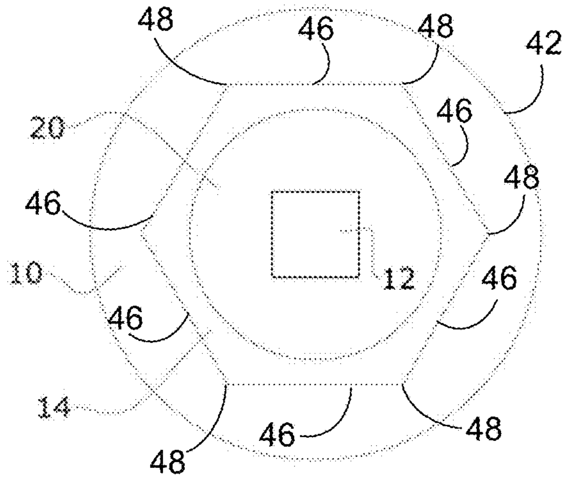

With reference to FIGS. 3 and 6-8 in particular, the example implementation of the socket 10 is illustrated. FIGS. 6-8 are front, top, and bottom views, respectively, of the example implementation of the socket 10. As shown in these figures, socket 10 is comprised of a drive cylinder 40 that is coupled to a socket head 42 by an angled shoulder portion 44. In some aspects, the socket 10 (and the aforementioned components) is a single-piece structure with the drive cylinder 40, socket head 42, and angled shoulder portion 44 integrally formed of a rigid material, such as a metal or composite. In some aspects, the material (metal, composite, or otherwise) can be spark resistant, non-flammable, and able to withstand the torque applied to the socket 10 by the tool 32 without deformation (e.g., twisting or shear) or failure.

At a top end of the socket 10 is a drive opening 12 to which the tool 32 can be coupled (e.g., to a square peg of the tool 32) such that torque and/or rotation of the tool 32 is transmitted to the socket 10. Optionally, a through all opening 18 (formed through a groove 16 that circumscribes the drive cylinder 40 between the drive opening 12 and the top end of the socket 10) is provided through the drive cylinder 40 an orthogonal to the drive opening 12. The through all opening 18, in some aspects, receives a portion of the tool 32 (such as a retractable detent on the square peg) to secure the tool 32 into the drive opening 12.

In this example, the drive cylinder 40 includes a bore 20 sized to receive the t-stud 30 therein when the socket 10 is positioned over the nut 28 (and t-stud 30). Although shown as a cylindrical bore 20, bore 20 can have other cross-sectional shapes as well, provided that contact interference between the t-stud 30 and drive cylinder 40 during rotation of the socket 10 is minimized or eliminated.

As shown in these figures, the drive cylinder 40 transitions to the socket head 42 through the angled shoulder portion 44. The socket head 42, in this example, includes a nut opening 14 sized to receive the nut 28 therein. The nut opening 14 is defined by multiple (in this example, six) sidewalls 46. Adjacent sidewalls 46 converge at points 48 (with the same number of points 48 as sidewalls 46). Although this nut opening 14 is a hexagonal opening, other openings are also contemplated by the present disclosure, such as double-square (eight sidewalls 46 and eight points 48), decagonal (ten sidewalls 46 and ten points 48), double hexagonal (twelve sidewalls 46 and twelve points 48), quadrilateral or square (four sidewalls 46 and four points 48), or otherwise.

Figure 12:
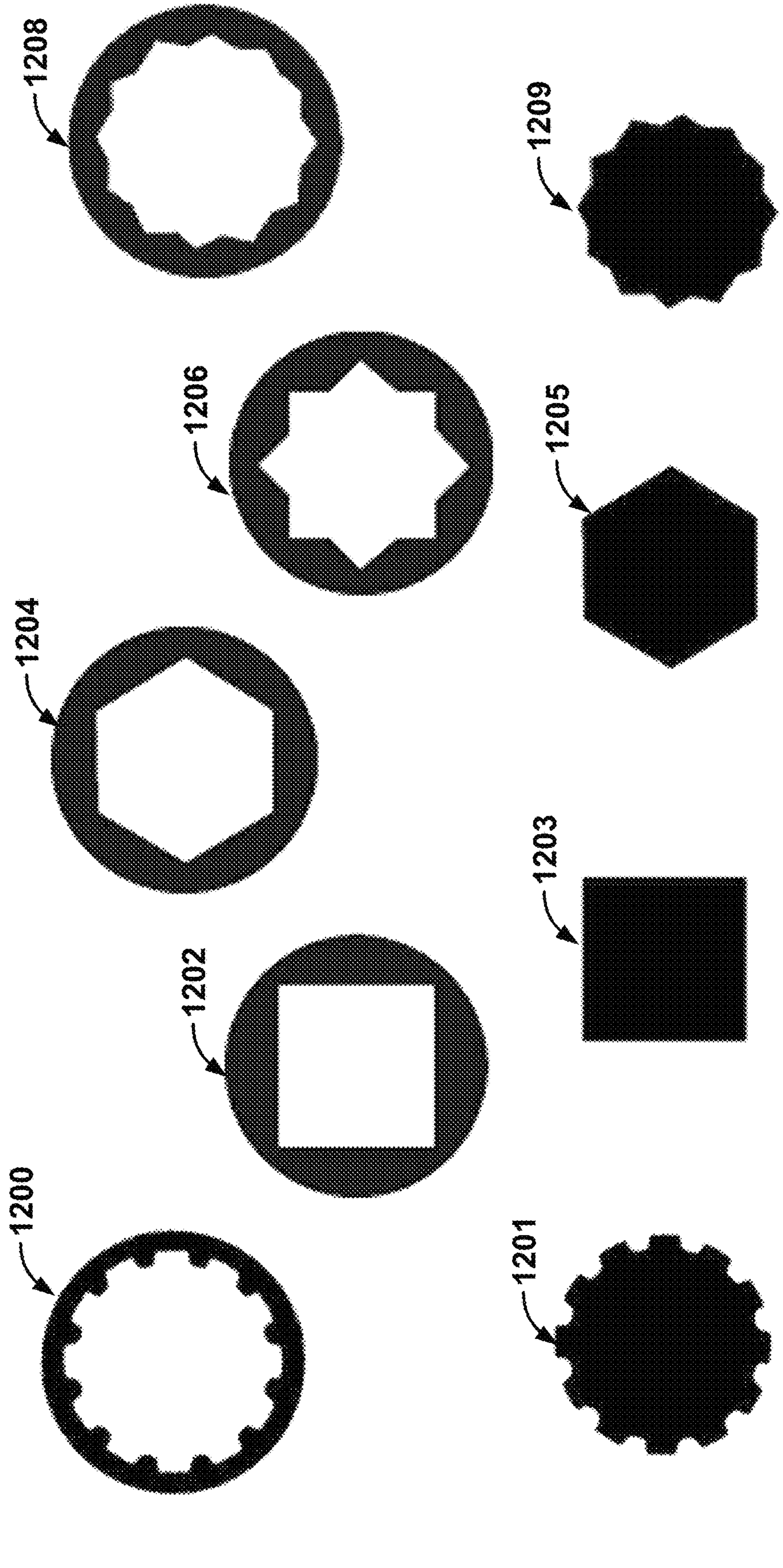
FIG. 12 is a schematic drawing of example shapes of socket head openings and corresponding nut shapes according to the present disclosure.

For example, turning briefly to FIG. 12, this figure shows example nut openings and cross-sectional views of example socket head openings. For example, example shapes include an M S-spline socket head 1200 to accept an M S-spline nut 1201; a four point socket head 1202 to accept a square nut 1203; a six point socket head 1204 to accept a hexagonal nut 1205; an eight point socket head 1206 (with corresponding octagonal nut not shown); and a twelve point socket head 1208 to accept a 24 sided nut 1209.

Generally, a socket head is specific (and should only be used with) a particular nut shape. The socket head does not grab the threads of a bolt, so threads are usually irrelevant when determining a socket size and shape. The diameter of the round bolt clearance hole is generally specified in the applicable ANSI or DIN spec and is only large enough to accommodate a threaded stud appropriate to a given nut size. The nut depth is cut appropriate to fit the height of a nut or bolt head made to ANSI or DIN standards.

During operation of the socket 10 (e.g., torque and rotation applied to the socket 10 by the tool 32 and transferred to the nut 28), the sidewalls 46 and points 48 are in contact with the nut 28 and are torque transferring surfaces and/or locations through which torque is transferred from the socket 10 to the nut 28. The sidewalls 46 and points 48 also, in some aspects, maintain or help maintain the nut 28 within the nut opening 14 (and generally, the socket head 42) during operation of the socket 10.

Figure 5:
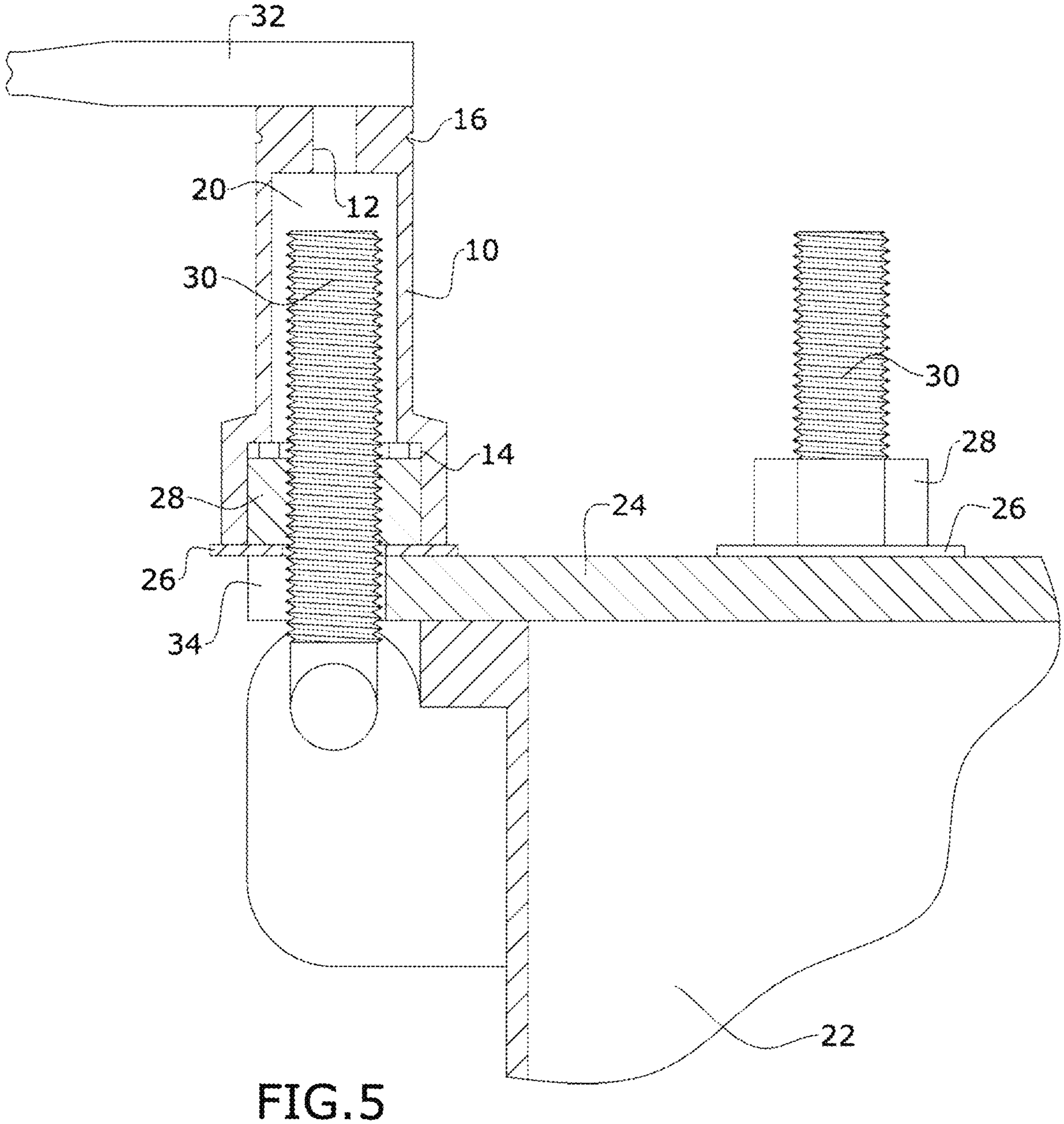
FIG. 5 is a section view taken along line 5-5 from FIG. 2 according to the present disclosure.

FIG. 5 is a section view taken along line 5-5 from FIG. 2 according to the present disclosure. As shown in this figure, the tool 32 is installed onto the socket 10 and, in turn, the socket 10 is installed over the t-stud 30 and nut 28. The washer 26 is installed over the t-stud 30 and secured to the open slot 34 (through which the t-stud 30 extends) and onto the lid 24. As shown in this example, the t-stud 30 extends into the bore 20 of the drive cylinder 40 of the socket 10; in particular, the bore 20 can be sized (e.g., longitudinally) to receive the full height of the t-stud 30 that extends away from the lid 24.

Figure 9:
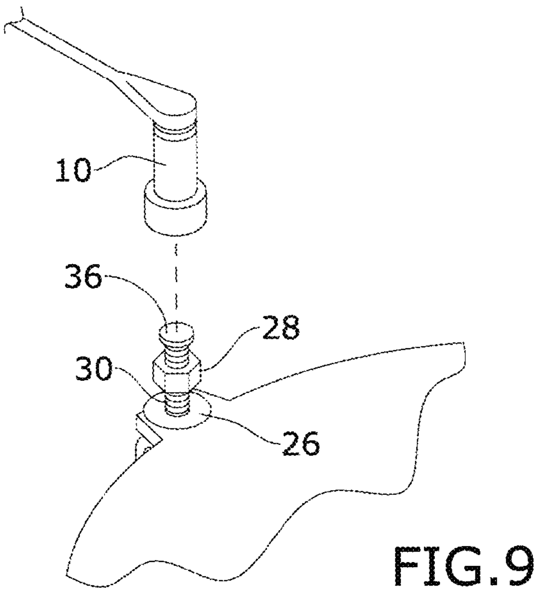
FIG. 9 is a perspective view of an example implementation of a socket, shown in use with a bolt with a retainer cap, according to the present disclosure.
Figure 10:
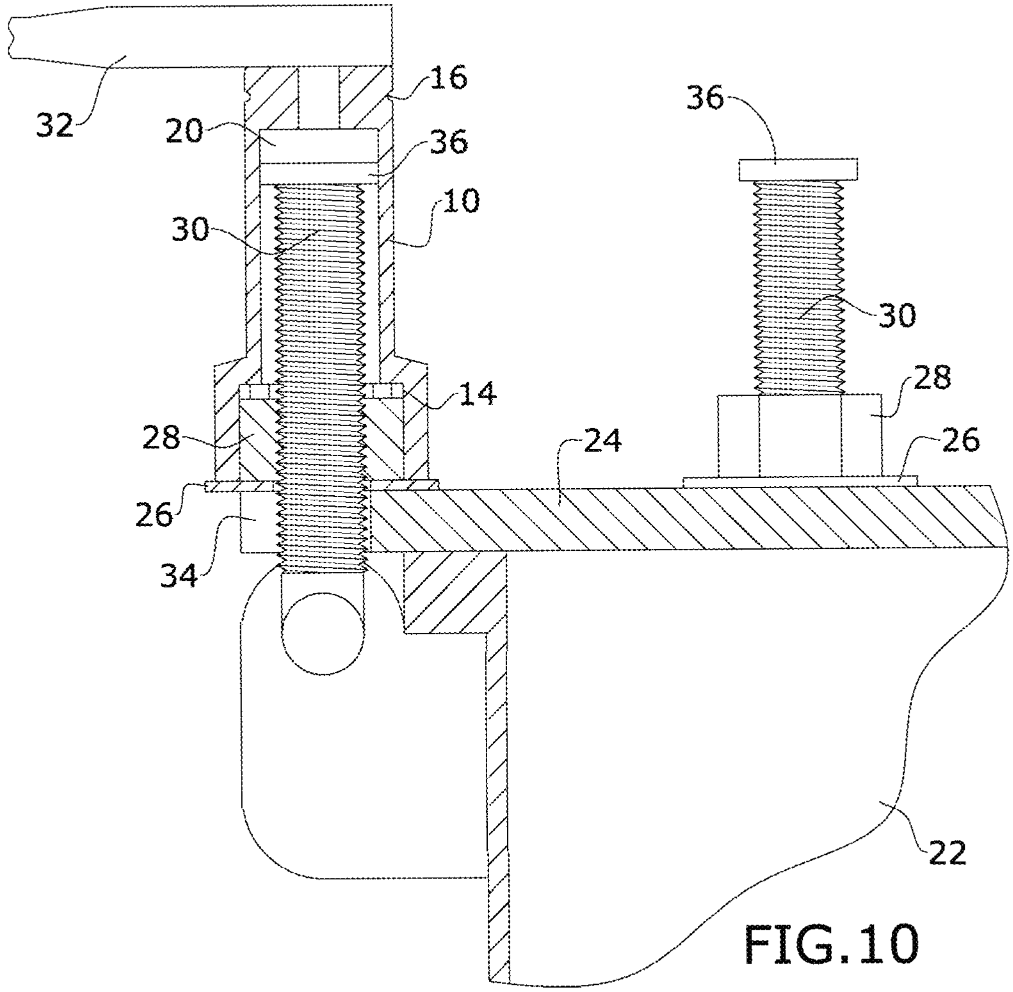
FIG. 10 is a section view of an example implementation of a socket in use with a bolt with a retainer cap according to the present disclosure.

FIGS. 9 and 10 shown another example implementation of the socket 10, in which the bore 20 is also sized to receive a t-stud 30 having a welded retainer cap 38 secured to a top surface of the t-stud 30. For instance, FIG. 9 is a perspective view of an example implementation of the socket 10 that is shown in use with the t-stud 30 (or bolt) with the retainer cap 38. FIG. 10 is a section view of an example implementation of the socket 10 in use with the t-stud 30 (or bolt) with the retainer cap 36. As shown in this figure, the tool 32 is installed onto the socket 10 and, in turn, the socket 10 is installed over the t-stud 30/retainer cap 36 and nut 28. The washer 26 is installed over the t-stud 30 (either prior to welding of the retainer cap 36 on the t-stud 30 or subsequently) and secured to the open slot 34 (through which the t-stud 30 extends) and onto the lid 24. As shown in this example, the t-stud 30 with the retainer cap 36 extends into the bore 20 of the drive cylinder 40 of the socket 10; in particular, the bore 20 in this example can be sized (e.g., longitudinally) to receive the full height of the t-stud 30 that extends away from the lid 24, as well as sized (e.g., radially) to receive the full diameter of the retainer cap 36.

Figure 11:
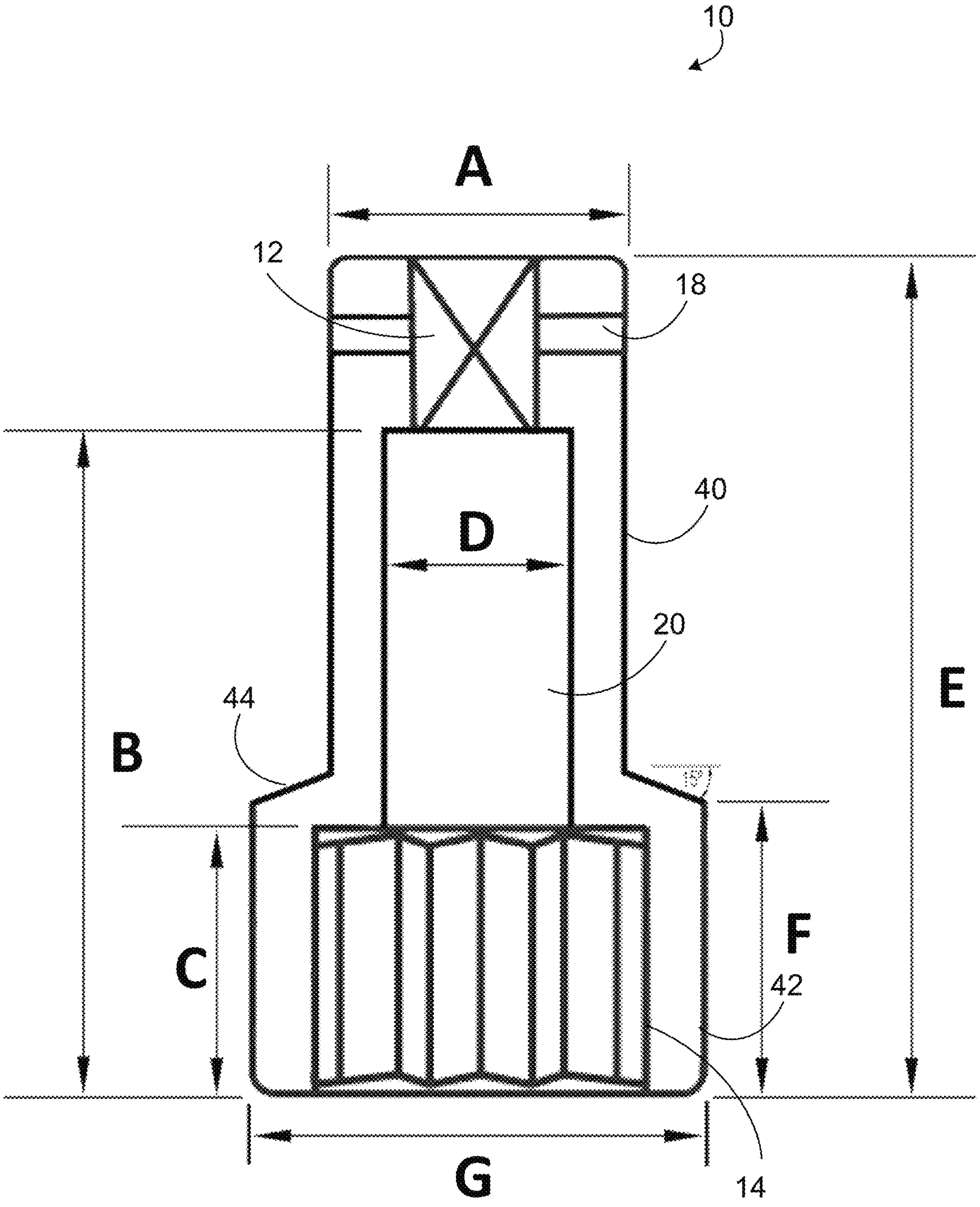
FIG. 11 is a schematic drawing of a dimensional example of a socket according to the present disclosure.

FIG. 11 is a schematic drawing of a dimensional example of the socket 10 according to the present disclosure. FIG. 11 shows example dimensions of certain features of the socket 10, including, for example, a diameter, A, of the drive cylinder 40; a height, B, of the nut opening 14 and bore 20 (in combination); a height, C, of the nut opening 14; a diameter, D, of the bore 20; an overall height, E, of the socket 10; a height, F, of the socket head 42; and a diameter, G, of the socket head 42. Table 1 shows a range of example dimensions for these features:

TABLE 1

| FEATURE | DIMENSION | RANGE (inches) |
|---|---|---|
| Drive end diameter | A | 1.5-3.5 |
| Stud clearance depth | B | 4.0-9.0 |
| Nut depth | C | 1.1-2.8 |
| Bore diameter | D | 1.2-2.8 |
| Overall length | E | 4.8-11.0 |
| Nut OD length | F | 1.4-3.5 |
| Nut end OD | G | 2.0-4.0 |

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A tanker rail car socket tool, comprising:

a drive cylinder comprising a bore sized to receive at least a portion of a threaded bolt configured to secure a tanker car lid to a tanker rail car, the drive cylinder comprising a groove circumferentially formed on an outer surface of the drive cylinder and an opening that extends through the drive cylinder at the groove;

a drive opening formed in a first end of the drive cylinder and sized to receive a portion of a tool configured to transmit torque to the drive cylinder when engaged with the drive opening, the opening extending through the drive cylinder orthogonal to the drive opening and configured to receive a portion of the tool when engaged with the drive cylinder; and a socket head coupled to a second end of the drive cylinder opposite the first end, the socket head comprising a nut opening defined by a plurality of torque-transferring surfaces, the torque-transferring surfaces configured to transfer the torque transmitted to the drive cylinder by the tool to a nut threaded over the threaded bolt to secure the tanker car lid to the tanker rail car, wherein:

a drive end diameter is between 1.5-3.5 inches, a stud clearance depth of the socket head is between 4.0-9.0 inches, a nut depth of the socket head is between 1.1-2.8 inches, a bore diameter of the drive cylinder is between 1.2-2.8 inches, an overall length is between 4.8-11.0 inches, a nut OD length is between 1.4-3.5 inches; and a nut end OD is between 2.0-4.0 inches.

2. The tanker rail car socket tool of claim 1, wherein the portion of the tool comprises a square peg.

3. The tanker rail car socket tool of claim 1, wherein the socket head is formed of a non-flammable and non-sparking material.

4. The tanker rail car socket tool of claim 1, wherein the socket head is integrally formed with the drive cylinder.

5. The tanker rail car socket tool of claim 1, comprising a shoulder formed between the drive cylinder and the socket head.

6. The tanker rail car socket tool of claim 1, wherein the plurality of torque-transferring surfaces comprise a plurality of points and a plurality of sidewalls.

7. The tanker rail car socket tool of claim 6, wherein a number of the plurality of points is at least equal to a number of the plurality of sidewalls.

8. The tanker rail car socket tool of claim 6, wherein the plurality of points and a plurality of sidewalls are configured to contactingly engage the nut to transfer the torque transmitted to the drive cylinder by the tool to the nut.

9. The tanker rail car socket tool of claim 6, wherein the plurality of points are one of: 4 points, 6 points, 8 points, or 12 points.

10. A method, comprising: identifying a threaded bolt that secures a tanker car lid to a tanker rail car; and operating a tanker rail car socket tool to thread or unthread a nut to or from the threaded bolt, the tanker rail car socket tool comprising: a drive cylinder comprising a bore sized to receive at least a portion of the threaded bolt, the drive cylinder comprising a groove circumferentially formed on an outer surface of the drive cylinder and an opening that extends through the drive cylinder at the groove, the opening extending through the drive cylinder orthogonal to a drive opening; the drive opening formed in a first end of the drive cylinder and sized to receive a portion of a tool configured to transmit torque to the drive cylinder when engaged with the drive opening; and a socket head coupled to a second end of the drive cylinder opposite the first end, the socket head comprising a nut opening defined by a plurality of torque-transferring surfaces, the torque-transferring surfaces configured to transfer the torque transmitted to the drive cylinder by the tool to the nut, wherein a drive end diameter is between 1.5-3.5 inches; a stud clearance depth of the socket head is between 4.0-9.0 inches, a nut depth of the socket head is between 1.1-2.8 inches; a bore diameter of the drive cylinder is between 1.2-2.8 inches; an overall length is between 4.8-11.0 inches; a nut OD length is between 1.4-3.5 inches; and a nut end OD is between 2.0-4.0 inches; and while operating the tanker rail car socket tool to thread or unthread the nut to or from the threaded bolt, engaging a portion of the tool received into the opening of the drive cylinder.

11. The method of claim 10, wherein the portion of the tool comprises a square peg.

12. The method of claim 10, wherein the socket head is formed of a non-flammable and non-sparking material.

13. The method of claim 10, wherein the socket head is integrally formed with the drive cylinder.

14. The method of claim 10, wherein the tanker rail car socket tool comprises a shoulder formed between the drive cylinder and the socket head.

15. The method of claim 10, wherein the plurality of torque-transferring surfaces comprise a plurality of points and a plurality of sidewalls.

16. The method of claim 15, wherein a number of the plurality of points is at least equal to a number of the plurality of sidewalls.

17. The method of claim 15, wherein the plurality of points and a plurality of sidewalls are configured to contactingly engage the nut to transfer the torque transmitted to the drive cylinder by the tool to the nut.

18. The method of claim 15, wherein the plurality of points are one of: 4 points, 6 points, 8 points, or 12 points.

19. The tanker rail car socket tool of claim 1, wherein the bore diameter is sized to fit over a retainer cap of the threaded bolt.

20. The method of claim 10, wherein the bore diameter is sized to fit over a retainer cap of the threaded bolt.

* * * * *